(12) United States Patent
Kosaka

(10) Patent No.: US 9,858,458 B2
(45) Date of Patent: Jan. 2, 2018

(54) DEVICE DETECTING SPATIAL VARIATION OF COMPLEX PERMITTIVITY AND SYSTEM DETECTING PRESENCE/ABSENCE OF ARTICLE

(71) Applicant: NEC CORPORATION, Tokyo, Japan (JP)

(72) Inventor: Keishi Kosaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/446,317

(22) Filed: Mar. 1, 2017

(65) Prior Publication Data

US 2017/0177914 A1 Jun. 22, 2017

Related U.S. Application Data

(63) Continuation of application No. 14/649,642, filed as application No. PCT/JP2013/005991 on Oct. 8, 2013, now Pat. No. 9,619,681.

(30) Foreign Application Priority Data

Dec. 4, 2012 (JP) ................................. 2012-265429

(51) Int. Cl.
*H04Q 5/22* (2006.01)
*G06K 7/10* (2006.01)
*G06K 19/077* (2006.01)

(52) U.S. Cl.
CPC ..... *G06K 7/10366* (2013.01); *G06K 7/10128* (2013.01); *G06K 19/07749* (2013.01); *G06K 19/07773* (2013.01)

(58) Field of Classification Search
CPC ......... G06K 7/10366; G06K 19/07773; G06K 19/07749
See application file for complete search history.

(56) References Cited

U.S. PATENT DOCUMENTS

2005/0134506 A1* 6/2005 Egbert ............. G06K 19/07749
343/700 MS
2006/0187061 A1* 8/2006 Colby .................. G06K 19/025
340/572.8
(Continued)

FOREIGN PATENT DOCUMENTS

CN 1696958 A 11/2005
CN 102203804 A 9/2011
(Continued)

OTHER PUBLICATIONS

Communication dated Dec. 22, 2015 from the Japanese Patent Office in counterpart application No. 2015-042506.
Communication dated Dec. 5, 2016 from the State Intellectual Property Office of the P.R.C. in counterpart Application No. 201380063494.1.
International Search Report for PCT/JP2013/005991 dated Nov. 26, 2013.

*Primary Examiner* — Erin File
(74) *Attorney, Agent, or Firm* — Sughrue Mion, PLLC

(57) ABSTRACT

Provided are a device detecting the spatial variation of the complex permittivity and an article presence/absence detection system which are capable of detecting the presence or absence of an article by using a UHF-band RFID tag. A device detecting the spatial variation of the complex permittivity includes an RFID tag, a conductor electrode unit, and a dielectric tag base material. The RFID tag performs communication using an electromagnetic wave in a UHF band. The conductor electrode unit communicates with the RFID tag by using the electromagnetic wave in the UHF band. The dielectric tag base material is provided between the RFID tag and the conductor electrode unit and separates the RFID tag from the electrode unit.

10 Claims, 11 Drawing Sheets

(56) References Cited

U.S. PATENT DOCUMENTS

| | | | |
|---|---|---|---|
| 2007/0007342 A1* | 1/2007 | Cleeves et al. | G06K 19/07749 235/435 |
| 2007/0290941 A1* | 12/2007 | Brown et al. | G01V 15/00 343/842 |
| 2009/0021352 A1* | 1/2009 | Kataya et al. | G06K 19/07749 340/10.1 |
| 2009/0231140 A1* | 9/2009 | Hong et al. | G06K 7/10346 340/572.7 |
| 2010/0123586 A1* | 5/2010 | Baba et al. | G06K 19/07749 340/572.8 |
| 2011/0018689 A1* | 1/2011 | Mcallister et al. | B65C 9/1865 340/10.1 |
| 2011/0037541 A1* | 2/2011 | Johnson et al. | G06K 19/0726 333/219.1 |
| 2011/0080270 A1* | 4/2011 | Kawase | G06K 19/07327 340/10.42 |
| 2011/0133889 A1 | 6/2011 | Thomas | |
| 2012/0061465 A1* | 3/2012 | Luo | G06K 7/10237 235/380 |
| 2013/0060520 A1* | 3/2013 | Amor et al. | G01S 5/0018 702/154 |
| 2014/0298927 A1* | 10/2014 | Allin et al. | A61F 13/00051 73/865.8 |

FOREIGN PATENT DOCUMENTS

| | | |
|---|---|---|
| JP | 2010-207376 A | 9/2010 |
| JP | 2011-125016 A | 6/2011 |
| JP | 2012-55146 A | 3/2012 |
| JP | 2012-132901 A | 7/2012 |

* cited by examiner

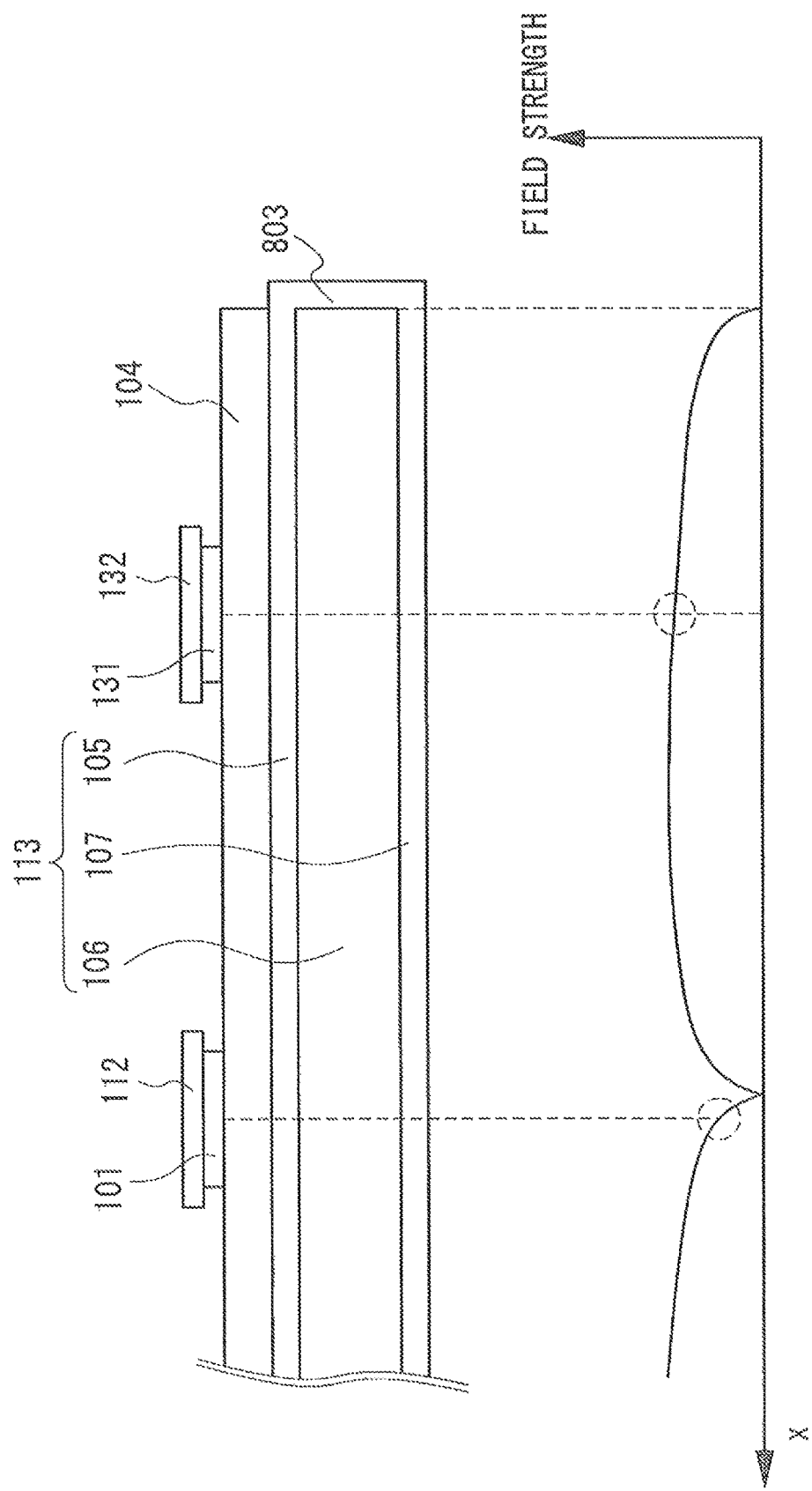

DEVICE DETECTING SPATIAL VARIATION OF COMPLEX PERMITTIVITY AND SYSTEM DETECTING PRESENCE/ABSENCE OF ARTICLE

This is a continuation of U.S. application Ser. No. 14/649,642, filed Jun. 4, 2015, which is a national stage of PCT/JP2013/005991, which claims priority to JP 2012-265429, filed Dec. 4, 2012. All of which are incorporated herein by reference.

TECHNICAL FIELD

The present invention relates to a device detecting a spatial variation of a complex permittivity and a system detecting presence/absence of an article.

BACKGROUND ART

In recent years, an article management system using an RFID (Radio Frequency Identification) tag has been used for the purpose of, for example, effective inventory management of articles (for example, Patent Literature 1).

As an article presence/absence detection system, for example, a technique has been proposed in which an interference unit that interferes with electromagnetic induction is attached to a bottom portion of each article and each article is placed immediately above an RFID tag. In this technique, an identification signal of each RFID tag is read by electromagnetic induction from a coil unit that is provided immediately below the corresponding RFID tag. At this time, the presence or absence of an article can be detected based on the presence or absence of the interference unit, i.e., based on a variation in the ratio of reading of the RFID tag. Accordingly, this article presence/absence detection system can be structured at a lower cost than a system in which RFID tags are attached to all articles by attaching the interference unit to a bottom portion of each of the articles. In a case where a relatively large metal body, such as a beverage can, is used as an article, the presence or absence of the article can be detected without attaching the interference unit to the article. This is because the ratio of reading of each RFID tag varies.

CITATION LIST

Patent Literature

[Patent Literature 1] Japanese Unexamined Patent Application Publication No. 2010-207376

SUMMARY OF INVENTION

Technical Problem

However, the present inventors have found that the above-mentioned article presence/absence detection system has the following problem. The above-mentioned article presence/absence detection system uses the electromagnetic induction caused by a coil to read each RFID tag, and thus assumes that an HF (High Frequency)-band RFID tag capable of reading each RFID tag by electromagnetic induction is used. In this case, as described above, in order to reliably detect the article to be detected, it is necessary to carry out processing for providing the interference unit, which results in an additional cost for management of the processing. To solve this problem, it is desirable to use RFID tags in a UHF (Ultra High Frequency) band. However, the above-mentioned case assumes only the use of RFID tags in the HF band, while RFID tags in the UHF band cannot be used. The present inventors have attempted to detect articles by replacing the RFID tags in the HF band disclosed in Patent Literature 1 with the RFID tags in the UHF band, but failed. Thus, an article presence/absence detection system using small, low-cost RFID tags in the UHF band cannot be achieved.

The present invention has been made in view of the above-mentioned circumstances, and an object of the present invention is to provide a device detecting a spatial variation of a complex permittivity and a system detecting presence/absence of an article which are capable of detecting the presence or absence of an article by using an RFID tag in a UHF band.

Solution to Problem

An exemplary aspect of the present invention is a device detecting a spatial variation of a complex permittivity including: an RFID tag that performs communication using an electromagnetic wave in a UHF band; an electrode unit that communicates with the RFID tag by using the electromagnetic wave in the UHF band; and a first dielectric layer that is provided between the RFID tag and the electrode unit and separates the RFID tag from the electrode unit.

Another exemplary aspect of the present invention is an article presence/absence detection system including: a device detecting a spatial variation of a complex permittivity; a reader/writer unit that outputs a read electromagnetic wave signal to the device detecting the spatial variation of the complex permittivity, and receives, from the device detecting the spatial variation of the complex permittivity, a response electromagnetic wave signal in response to the read electromagnetic wave signal, thereby performing an RFID tag reading operation; an interface unit that mediates an exchange of the electromagnetic wave signals between the device detecting the spatial variation of the complex permittivity and the reader/writer unit; and a display unit that displays a result of the reading operation performed by the reader/writer unit. The device detecting the spatial variation of the complex permittivity includes: the RFID tag that performs communication by using the read electromagnetic wave signal and the response electromagnetic wave signal in a UHF band; an electrode unit that communicates with the RFID tag by using the read electromagnetic wave signal and the response electromagnetic wave signal; and a first dielectric layer that is provided between the RFID tag and the electrode unit and separates the RFID tag from the electrode unit.

Advantageous Effects of Invention

According to the present invention, it is possible to provide a device detecting a spatial variation of a complex permittivity and a system detecting presence/absence of an article which are capable of detecting the presence or absence of an article by using a UHF-band RFID tag.

BRIEF DESCRIPTION OF DRAWINGS

FIG. 9 is a front view schematically showing a configuration of a device detecting a spatial variation of a complex permittivity when there is an impedance discontinuity in a mode of an electromagnetic wave to be transmitted.

DESCRIPTION OF EMBODIMENTS

Figure 1A:
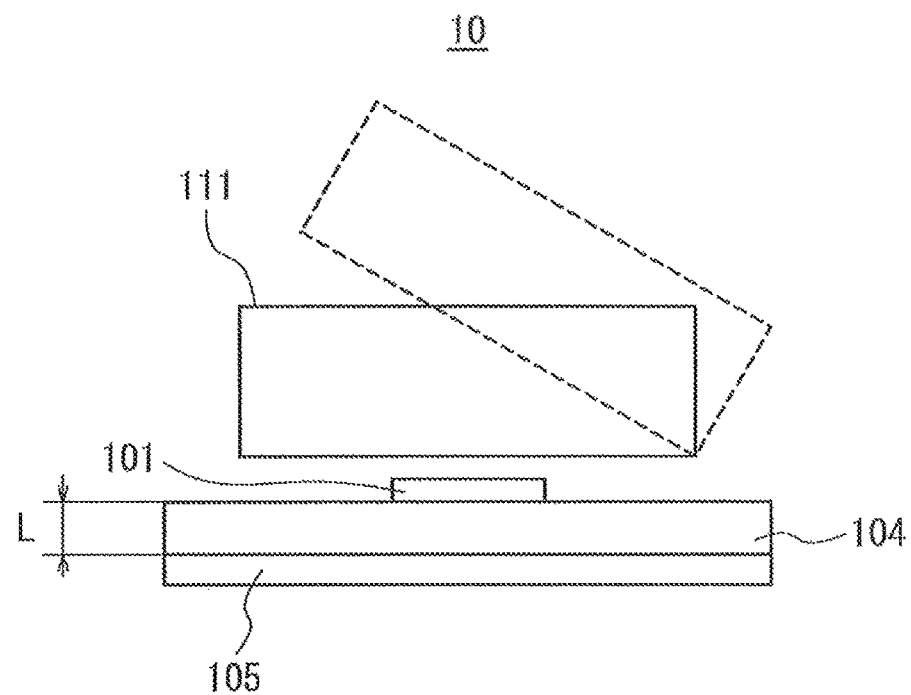
FIG. 1A is a front view schematically showing a configuration of a device detecting a spatial variation of a complex permittivity 10.

Exemplary embodiments of the present invention will be described below with reference to the drawings. In the drawings, the same elements are denoted by the same reference numerals, and a redundant explanation is omitted as needed. The following exemplary embodiments include technically preferable limitations for carrying out the present invention. However, these limitations are not intended to limit the scope of the invention to these exemplary embodiments.

First Exemplary Embodiment

Figure 1B:
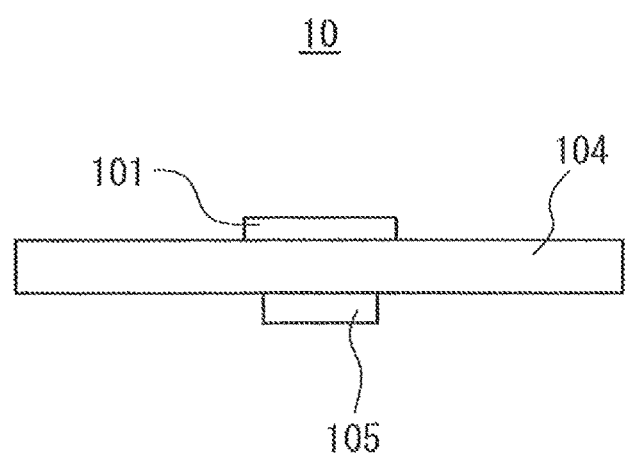
FIG. 1B is a side view schematically showing the configuration of the device detecting the spatial variation of the complex permittivity 10.

First, a device detecting a spatial variation of a complex permittivity 10 according to a first exemplary embodiment will be described. FIG. 1A is a front view schematically showing the configuration of the device detecting the spatial variation of the complex permittivity 10. FIG. 1B is a side view schematically showing the configuration of the device detecting the spatial variation of the complex permittivity 10. The device detecting the spatial variation of the complex permittivity 10 includes an RFID tag 101, a dielectric tag base material 104, and a conductor electrode unit 105. The term "dielectric" described below refers to a material having electrical insulation properties. In other words, the dielectric can be regarded as a non-conductive material.

Figure 1C:
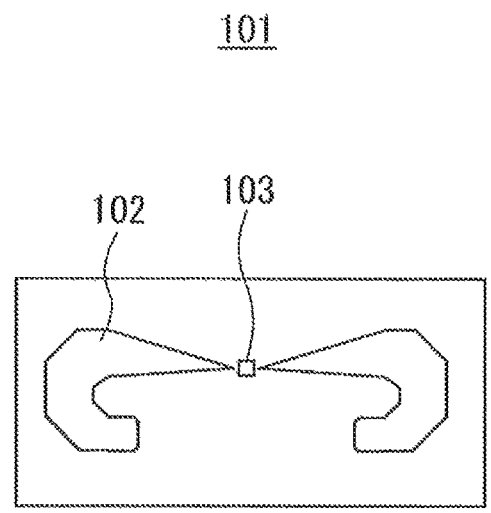
FIG. 1C is a top view schematically showing a configuration of an RFID tag 101.

The RFID tag 101 will be described below. FIG. 1C is a top view schematically showing the configuration of the RFID tag 101. The RFID tag 101 is an RFID tag that operates in a UHF band. The RFID tag 101 includes a conductor tag antenna unit 102 and an IC unit 103. The conductor tag antenna unit 102 receives a read electromagnetic wave signal transmitted from the conductor electrode unit 105 which is described later. The conductor tag antenna unit 102 transmits a response electromagnetic wave signal as a response to the reception of the read electromagnetic wave signal. The IC unit 103 receives the read electromagnetic wave signal, and controls the operation of the RFID tag 101 which transmits the response electromagnetic wave signal.

Figure 1D:
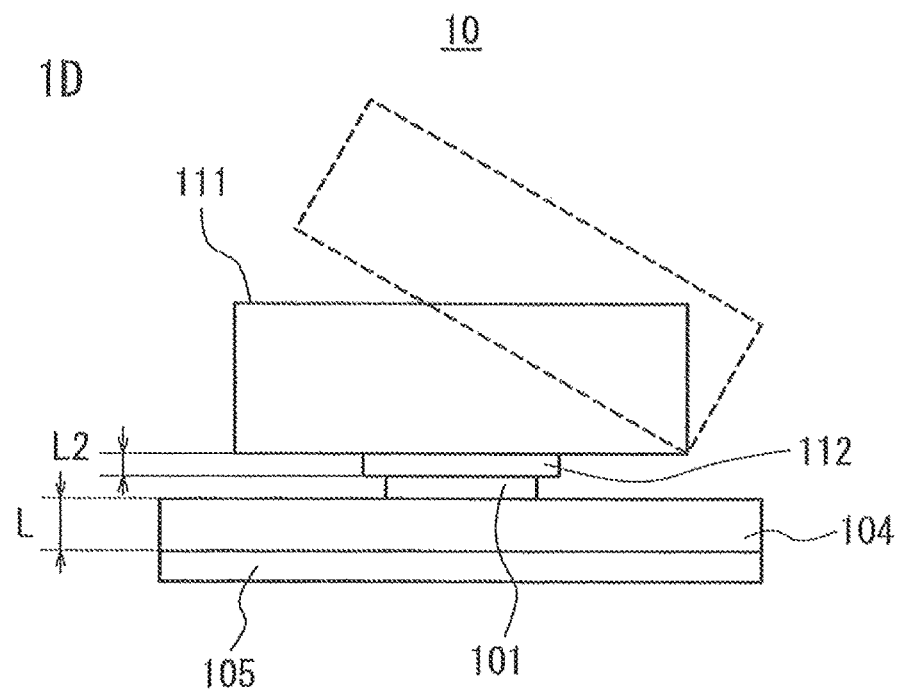
FIG. 1D is a front view schematically showing a configuration in which a dielectric protective layer 112 is provided on the RFID tag 101.
Figure 1E:
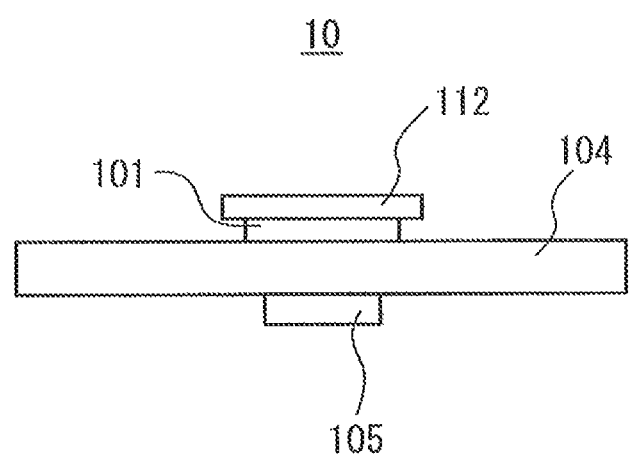
FIG. 1E is a side view schematically showing the configuration in which the dielectric protective layer 112 is provided on the RFID tag 101.

A dielectric protective layer 112 may be provided on one surface of the RFID tag 101. FIG. 1D is a front view schematically showing the configuration in which the dielectric protective layer 112 is provided on the RFID tag 101. FIG. 1E is a side view schematically showing the configuration in which the dielectric protective layer 112 is provided on the RFID tag 101. The dielectric protective layer 112 is provided on the RFID tag 101 to prevent deterioration of the RFID tag 101 which is caused when the RFID tag is brought into direct contact with other objects such as an article 111. In this case, however, the dielectric protective layer 112 having a high permittivity is not suitable because it is preferable that the communication performance of the RFID tag 101 be less likely to deteriorate due to the dielectric protective layer 112. A distance L2 between the RFID tag 101 and the article 111 is increased due to the dielectric protective layer 112. However, since it is necessary that the communication performance of the RFID tag 101 be varied by the article 111, the distance L2 is desirably equal to or less than 1/10 of the wavelength of the electromagnetic wave used for the RFID tag 101. However, the distance L2 is not limited to 1/10 or less of the wavelength of the electromagnetic wave used for the RFID tag 101.

The dielectric tag base material 104 is provided between the conductor electrode unit 105 and the RFID tag 101. The position of the dielectric tag base material 104 is fixed in such a manner that a distance L between the RFID tag 101 and the conductor electrode unit 105 is substantially constant at a value other than 0 when the device detecting the spatial variation of the complex permittivity 10 detects a complex permittivity variation. In the case of providing the dielectric protective layer 112 on the RFID tag 101, the dielectric tag base material 104 is provided at a position opposed to the dielectric protective layer 112 with the RFID tag 101 interposed therebetween. Accordingly, it can be understood that the RFID tag 101, the dielectric tag base material 104, and the conductor electrode unit 105 constitute a structure that is incorporated in the device detecting the spatial variation of the complex permittivity 10 as a component and is physically separated from the article 111. For example, the RFID tag 101, the dielectric tag base material 104, and the conductor electrode unit 105 are physically fixed by, for example, adhesion or structural joining, so as not to change the positional relationship among the RFID tag 101, the dielectric tag base material 104, and the conductor electrode unit 105.

In this exemplary embodiment, the article 111, the presence or absence of which is to be detected, is placed above the RFID tag 101.

Figure 2:
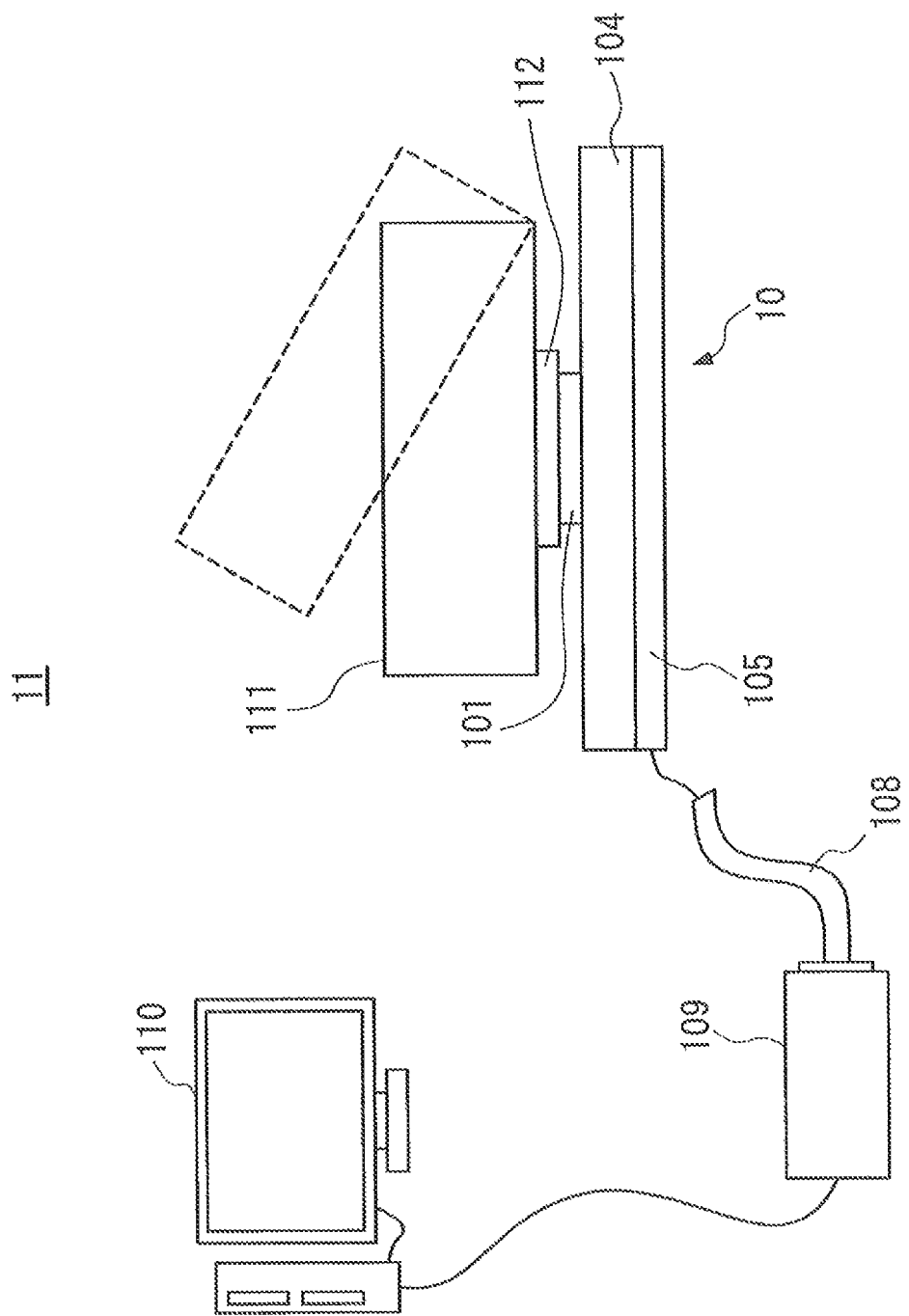
FIG. 2 is a front view schematically showing a configuration of an article presence/absence detection system 11.

The above-mentioned device detecting the spatial variation of the complex permittivity 10 is incorporated, as appropriate, in an article presence/absence detection system 11. FIG. 2 is a front view schematically showing the configuration of the article presence/absence detection system 11. The article presence/absence detection system 11 includes the device detecting the spatial variation of the complex permittivity 10, an interface unit 108, an RFID reader/writer 109, and an indicator 110.

The RFID reader/writer 109 is an example of an electronic device for tag reading. The interface unit 108 is connected to the conductor electrode unit 105, and mediates an exchange of electromagnetic wave signals between the conductor electrode unit 105 and other devices. The RFID reader/writer 109 outputs the read electromagnetic wave signal to the conductor electrode unit 105 of the device detecting the spatial variation of the complex permittivity 10 via the interface unit 108. The RFID reader/writer 109 receives the response electromagnetic wave signal, which has been received by the conductor electrode unit 105 from the RFID tag 101, via the interface unit 108. The RFID reader/writer 109 outputs an article detection result to the indicator 110 according to the response electromagnetic wave signal.

For example, a personal computer can be used as the indicator 110. The indicator 110 displays the article detection result on, for example, a monitor, in a visible manner.

Next, the operation of the device detecting the spatial variation of the complex permittivity 10 will be described. First, the RFID reader/writer 109 outputs the read electromagnetic wave signal to the conductor electrode unit 105 of the device detecting the spatial variation of the complex permittivity 10 via the interface unit 108. The read electromagnetic wave signal is transmitted to the RFID tag 101 from the conductor electrode unit 105.

The RFID tag 101 transmits the response electromagnetic wave signal as a response to the reception of the read electromagnetic wave signal.

The RFID reader/writer 109 receives the response electromagnetic wave signal, which has been received by the conductor electrode unit 105 from the RFID tag 101, via the interface unit 108. The RFID reader/writer 109 outputs the article detection result to the indicator 110 according to the response electromagnetic wave signal.

After that, the indicator 110 displays the article detection result in a visible manner.

The principle of article detection according to this exemplary embodiment will be described. A case in which an HF-band RFID tag is used instead of the RFID tag 101 will be described as the basis for understanding the principle of article detection according to this exemplary embodiment.

The wavelength of an HF-band electromagnetic wave is about 22 m. Accordingly, in order to enable communication in an HF band with an RFID tag of practical size, both the tag and the reader transmit and receive signals by the excitation of an induced current at the electrode by means of electromagnetic induction in an oscillating magnetic field that penetrates through a coil type electrode. Thus, the HF-band RFID tag is sensitive to a variation in the magnetic permeability of the surrounding space that causes a variation in the magnetic field strength during communication.

However, many of nonmetal substances having no paramagnetism have a magnetic permeability that is substantially the same as that of air. Accordingly, even when a general article is disposed alone in the vicinity of the HF-band RFID tag, the magnetic field strength is less likely to change and rarely has an effect on the communication performance of the RFID tag. Accordingly, in Patent Literature 1 described above, the interference unit that interferes with electromagnetic induction is provided on a bottom portion of each article (except relatively large metal products such as a beverage can). This configuration can cause a difference between the state of electromagnetic induction when an article is disposed in the vicinity of the RFID tag and the state of electromagnetic induction when no article is disposed in the vicinity of the RFID tag. The presence or absence of an article in the vicinity of the RFID tag is detected by detecting a variation in the state of electromagnetic induction.

On the other hand, the UHF-band RFID tag 101 according to this exemplary embodiment operates based on the following principle. That is, the conductor tag antenna unit 102 of the RFID tag 101 is an antenna that resonates at UHF-band frequencies, and causes resonance by an oscillating electric field that oscillates mainly at UHF-band frequencies. Accordingly, the RFID tag 101 is sensitive to a variation in the complex permittivity of the surrounding space that causes a variation in the electric field strength during communication.

Specifically, when other objects such as the article 111 are present in the space in the vicinity of the RFID tag 101, a spatial variation of a complex permittivity in the vicinity of the RFID tag 101 is caused by the article 111. Accordingly, the electric field strength in the space in the vicinity of the RFID tag 101 varies during communication. The device detecting the spatial variation of the complex permittivity 10 detects a variation in the response electromagnetic wave signal which is caused by a variation in the electric field strength, thereby detecting the presence or absence of other objects, such as the article 111, in the space in the vicinity of the RFID tag 101.

Other objects such as the article 111 are various types of objects including metal, nonmetal, a dielectric material, and water. Many of the objects such as the article 111 have a permittivity that is different from the permittivity of the space. Therefore, unlike Patent Literature 1, the device detecting the spatial variation of the complex permittivity 10 and the article presence/absence detection system 11 can detect the presence or absence of an article without the need for any special processing, such as formation of the above-mentioned interference unit on the article, even in the case of using various types of articles which are not formed of a relatively large metal.

The UHF-band RFID tag 101 is generally cheaper and smaller than the HF-band RFID tag. Thus, the device detecting the spatial variation of the complex permittivity 10 and the article presence/absence detection system 11 have an advantage in terms of downsizing and cost reduction.

Note that the electromagnetic field coupling between the UHF-band RFID tag 101 and the conductor electrode unit 105 is stronger than that in the HF band. Accordingly, in the configuration in which the RFID tag 101 and the conductor electrode unit 105 are in contact with each other, the electromagnetic field coupling between the RFID tag 101 and the conductor electrode unit 105 is extremely strong, which leads to a large variation in the communication performance of the RFID tag 101. Through the actual measurements, the present inventor has found that even when other objects such as the article 111 are disposed in the vicinity of the RFID tag 101 in this state, the response electromagnetic wave signal does not vary any more in some cases, which makes it difficult to detect the article 111.

On the other hand, in the device detecting the spatial variation of the complex permittivity 10, the dielectric tag base material 104 is disposed between the RFID tag 101 and the conductor electrode unit 105, thereby preventing the RFID tag 101 and the conductor electrode unit 105 from being in contact with each other. This configuration makes it possible to prevent the phenomenon in which the electromagnetic field coupling between the RFID tag 101 and the conductor electrode unit 105 is extremely strong. Consequently, the device detecting the spatial variation of the complex permittivity 10 can accurately detect the presence or absence of an article by using the UHF-band RFID tag 101.

From the actual measurements, it is desirable that the distance L between the RFID tag 101 and the conductor electrode unit 105 be about 1/100 or more of the vacuum wavelength of the electromagnetic wave used for the communication signals (the read electromagnetic wave signal and the response electromagnetic wave signal) between the RFID tag 101 and the conductor electrode unit 105. However, the distance L is not limited to this range.

On the other hand, when the distance L is large, the electromagnetic field coupling between the UHF-band RFID tag 101 and the conductor electrode unit 105 is decreased, so that the electromagnetic wave signals are exchanged mainly in a radiated field. However, in order to use the radiated field, a structure such as an antenna which resonates at frequencies of electromagnetic waves used for signals and effectively radiates electromagnetic waves should be used for the conductor electrode unit 105 and the structure associated with the conductor electrode unit 105, in view of signal strength. In this case, the electromagnetic wave signal at the same level as the signal reaching the RFID tag 101 extends over a wide space other than the RFID tag 101. As a result, the exchange of the electromagnetic wave signals is more likely to be affected by disturbance. Therefore, from the actual measurements, it is desirable that the distance L be equal to or less than 1/4 of the vacuum wavelength of the electromagnetic wave used for the communication signals (the read electromagnetic wave signal and the response electromagnetic wave signal) between the RFID tag 101 and the conductor electrode unit 105. However, the distance L is not limited to this range.

Furthermore, the dielectric tag base material 104 has a function of preventing other objects from entering the space between the RFID tag 101 and the conductor electrode unit 105. This function makes it possible to stably exchange the electromagnetic wave signals between the RFID tag 101 and the conductor electrode unit 105, without being affected by other objects. As a result, the exchange of the electromagnetic wave signals between the RFID tag 101 and the conductor electrode unit 105 is less likely to be affected by disturbance, and thus the response electromagnetic wave signal varies only in accordance with a variation in the communication performance of the RFID tag 101 due to the presence of the article 111. Consequently, the presence or absence of an article can be more accurately detected.

Second Exemplary Embodiment

Figure 3A:
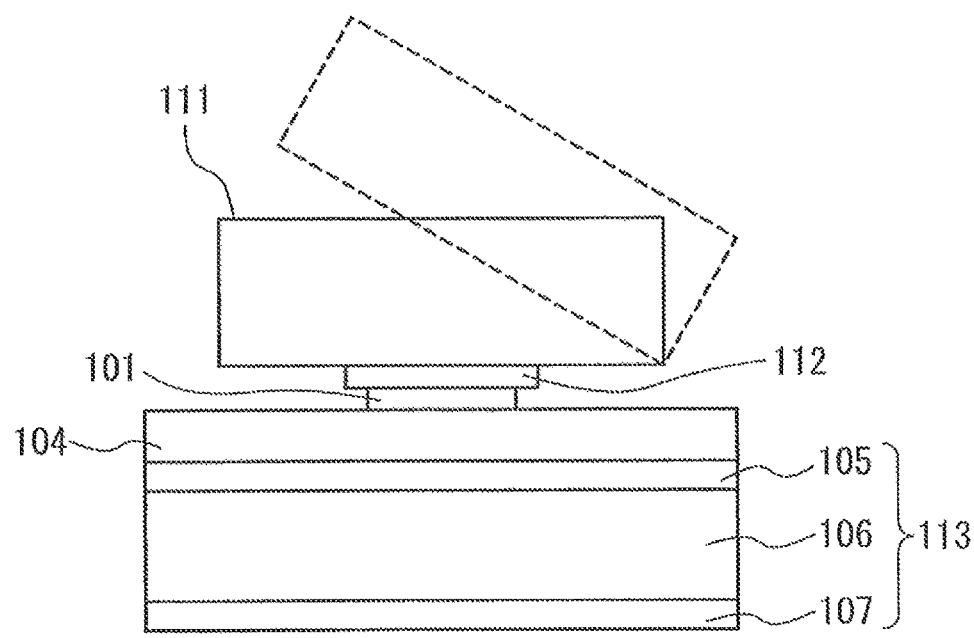
FIG. 3A is a front view schematically showing a configuration of a device detecting a spatial variation of a complex permittivity 20.
Figure 3B:
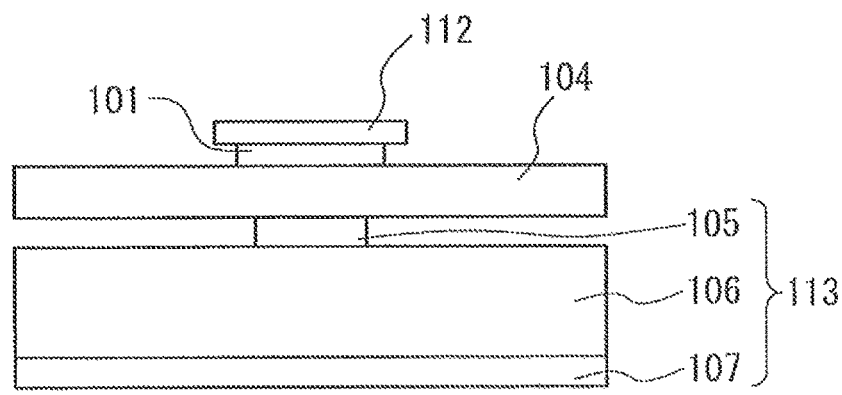
FIG. 3B is a side view schematically showing the device detecting the spatial variation of the complex permittivity 20.

Next, a device detecting a spatial variation of a complex permittivity 20 according to a second exemplary embodiment will be described. FIG. 3A is a front view schematically showing the configuration of the device detecting the spatial variation of the complex permittivity 20. FIG. 3B is a side view schematically showing the configuration of the device detecting the spatial variation of the complex permittivity 20. The device detecting the spatial variation of the complex permittivity 20 has a configuration in which a dielectric layer 106 and a conductor plate 107 are additionally provided to the device detecting the spatial variation of the complex permittivity 10. In the device detecting the spatial variation of the complex permittivity 20, the dielectric layer 106 is provided between the conductor plate 107 and the conductor electrode unit 105.

The conductor electrode unit 105, the dielectric layer 106, and the conductor plate 107 constitute an open-type transmission line 113.

When a completely closed transmission line, such as a coaxial line, in which the conductor electrode unit 105 is surrounded by another conductor with no holes, is used instead of the open-type transmission line, the conductor electrode unit 105 is completely shielded from the RFID tag 101 by the conductor, which makes it difficult to transmit the electromagnetic wave signal to the RFID tag 101. For this reason, it is not appropriate to use a completely closed transmission line.

In other words, it can be understood that the open-type transmission line 113 is a transmission line having a structure in which the conductor electrode unit 105 is not completely shielded from the RFID tag 101 by the conductor. Typical examples of the open-type transmission line include a twin-lead type transmission line, transmission lines similar to the twin-lead type transmission line, and transmission lines such as a microstripline, a coplanar line, and a slot line. In addition, a grounded coplanar line and a tri-plate line, which are modified examples of the above-mentioned transmission lines, can also be used.

The open-type transmission line 113 according to this exemplary embodiment is less likely to attenuate with the distance, as compared with the case where the conductor electrode unit 105 according to the first exemplary embodiment is used alone. Accordingly, the open-type transmission line 113 is less affected by the surrounding environment and enables more stable transmission of electromagnetic wave signals. Therefore, according to this structure, it is possible to provide a device detecting a spatial variation of a complex permittivity in which the open-type transmission line 113 enables more stable transmission of electromagnetic wave signals, and an article presence/absence detection system incorporating the device detecting the spatial variation of the complex permittivity.

Third Exemplary Embodiment

Figure 4:
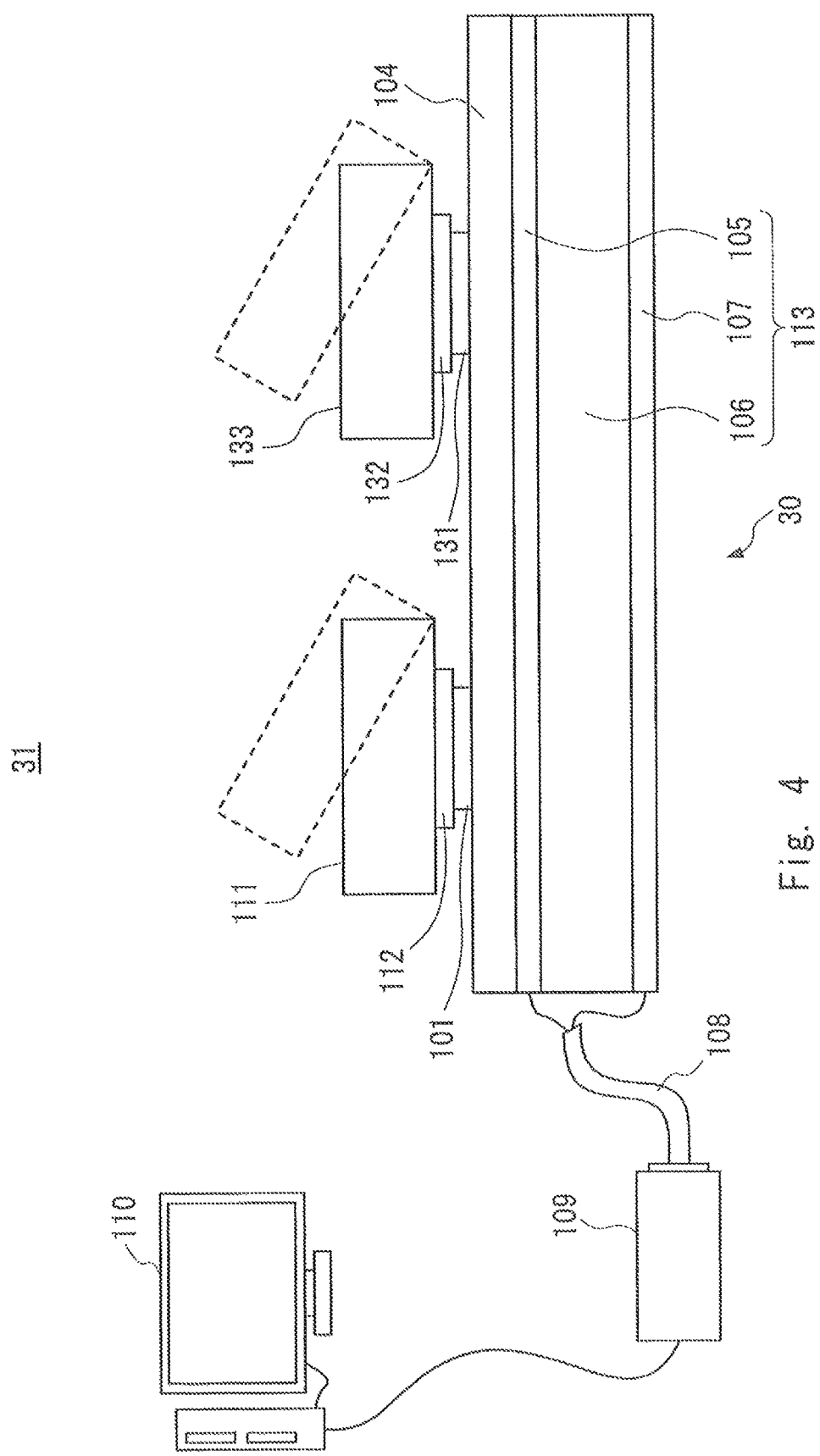
FIG. 4 is a front view schematically showing a configuration of an article presence/absence detection system 31 including a device detecting a spatial variation of a complex permittivity 30.

Next, a device detecting a spatial variation of a complex permittivity 30 according to a third exemplary embodiment will be described. FIG. 4 is a front view schematically showing a configuration of an article presence/absence detection system 31 including the device detecting the spatial variation of the complex permittivity 30. The device detecting the spatial variation of the complex permittivity 30 has a configuration in which an RFID tag 131 is additionally provided to the device detecting the spatial variation of the complex permittivity 20. A dielectric protective layer 132 corresponds to the dielectric protective layer 112. An article 133 corresponds to the article 111.

In the device detecting the spatial variation of the complex permittivity 30, the RFID tag 101 and the RFID tag 131 are disposed at different positions on the dielectric tag base material 104 in such a manner that the RFID tag 101 and the RFID tag 131 do not overlap each other. The RFID tag 101 and the RFID tag 131 are respectively provided with different identification codes. The other components of the article presence/absence detection system 31 are similar to those of the article presence/absence detection system 11, and thus the description thereof is omitted.

In this exemplary embodiment, the RFID tag 101 and the RFID tag 131 include different identification codes, respectively. Accordingly, one of the RFID tag 101 and the RFID tag 131 can be specified as a reading target by the read electromagnetic wave signal output from the RFID reader/writer 109. Further, the presence or absence of an article in the vicinity of the specified RFID tag can be detected using a variation of the complex permittivity. This enables individual management for discriminating the RFID tag to be read and detecting the presence or absence of an article for each RFID tag.

Thus, according to this configuration, it is possible to provide a device detecting a spatial variation of a complex permittivity and an article presence/absence detection system which is capable of individually detecting the presence or absence of a plurality of articles disposed at different positions.

While FIG. 4 illustrates the case of using two RFID tags, three or more different RFID tags including different identification codes, respectively, may be used.

Figure 5:
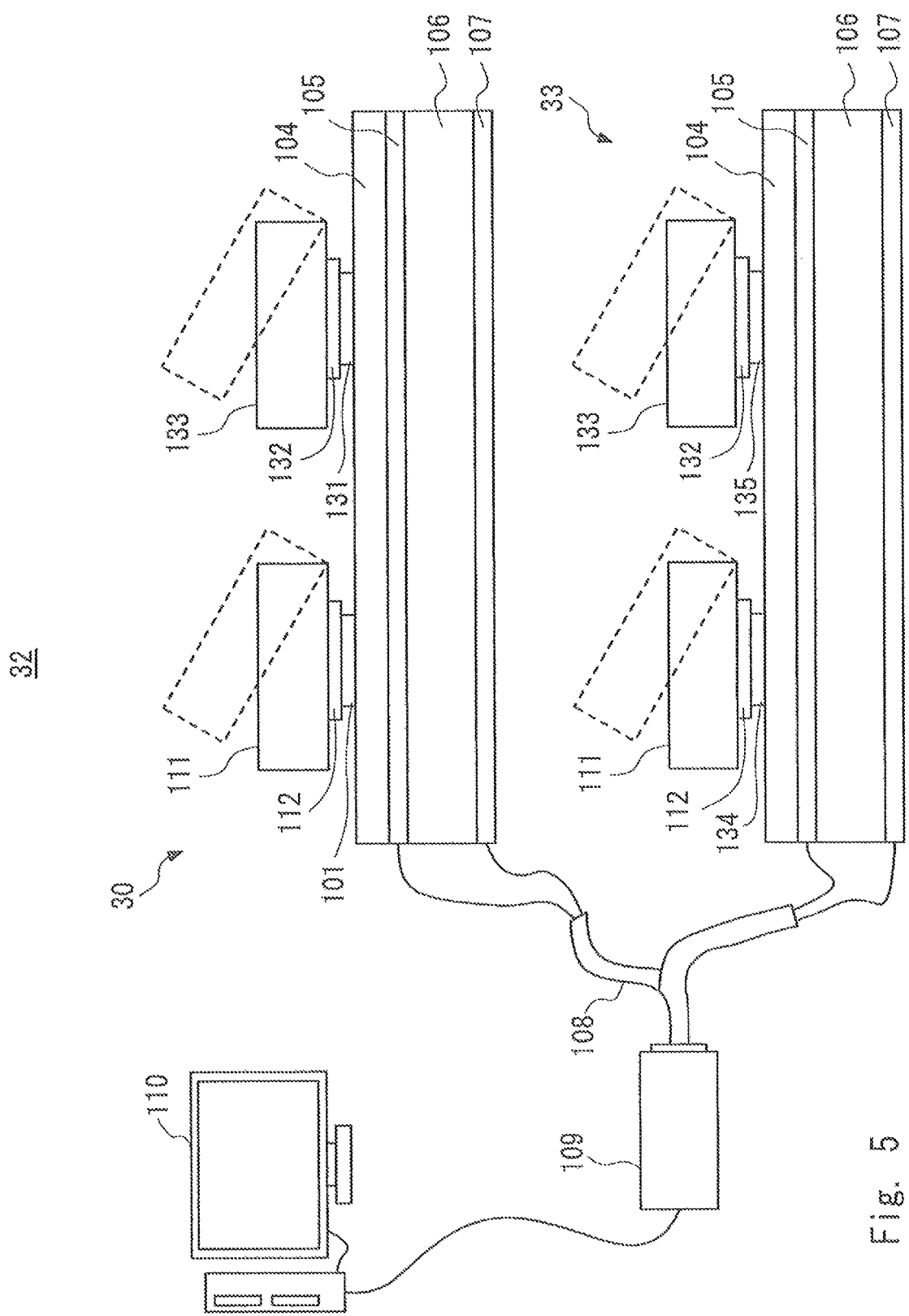
FIG. 5 is a front view schematically showing a configuration of an article presence/absence detection system 32 as a modified example of the article presence/absence detection system 31.

Further, a plurality of devices detecting a spatial variation of a complex permittivity may be provided. FIG. 5 is a front view schematically showing a configuration of an article presence/absence detection system 32 as a modified example of the article presence/absence detection system 31. As shown in FIG. 5, the article presence/absence detection system 32 has a configuration in which a device detecting a spatial variation of a complex permittivity 33 is additionally provided to the article presence/absence detection system 31.

The device detecting the spatial variation of the complex permittivity 33 has the same configuration as that of the device detecting the spatial variation of the complex permittivity 30. Note that RFID tags 134 and 135 of the device detecting the spatial variation of the complex permittivity 33 respectively correspond to the RFID tags 101 and 131 of the device detecting the spatial variation of the complex permittivity 30. The RFID tags 101, 131, 134, and 135 include different identification codes, respectively. The device detecting the spatial variation of the complex permittivity 33 is connected to the RFID reader/writer 109 via the interface unit 108, as with the device detecting the spatial variation of the complex permittivity 30.

According to this configuration, it is possible to provide a device detecting a spatial variation of a complex permittivity and an article presence/absence detection system which are capable of individually detecting the presence or absence of a number of articles, which are disposed at different positions, by increasing the number of devices detecting a spatial variation of a complex permittivity.

While FIG. 5 illustrates the case of using two devices detecting a spatial variation of a complex permittivity, three or more devices detecting the spatial variation of the complex permittivity may be provided as long as the devices detecting the spatial variation of the complex permittivity respectively include different identification codes for each RFID tag.

Fourth Exemplary Embodiment

Figure 6A:
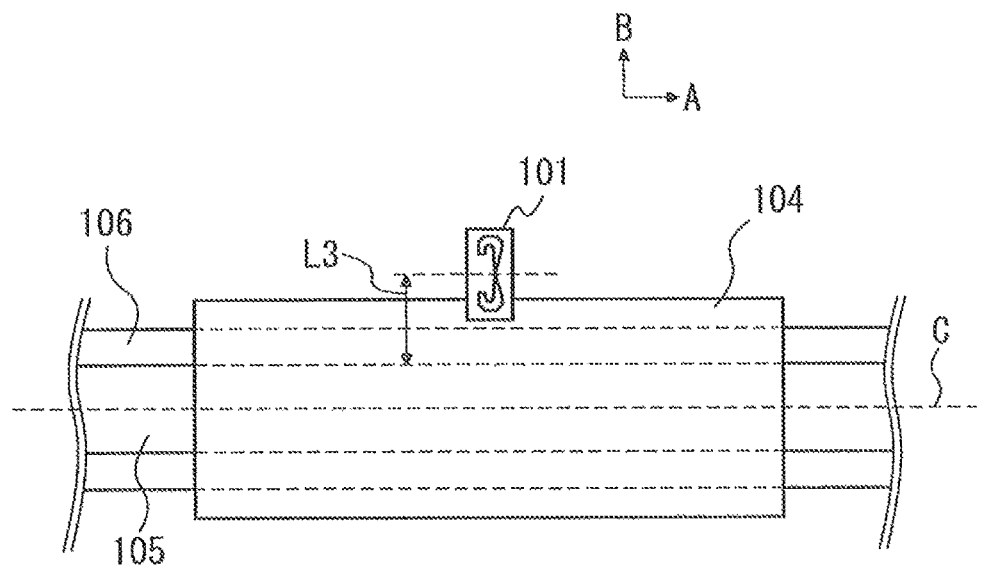
FIG. 6A is a top view schematically showing a configuration of a device detecting a spatial variation of a complex permittivity 40.
Figure 6B:
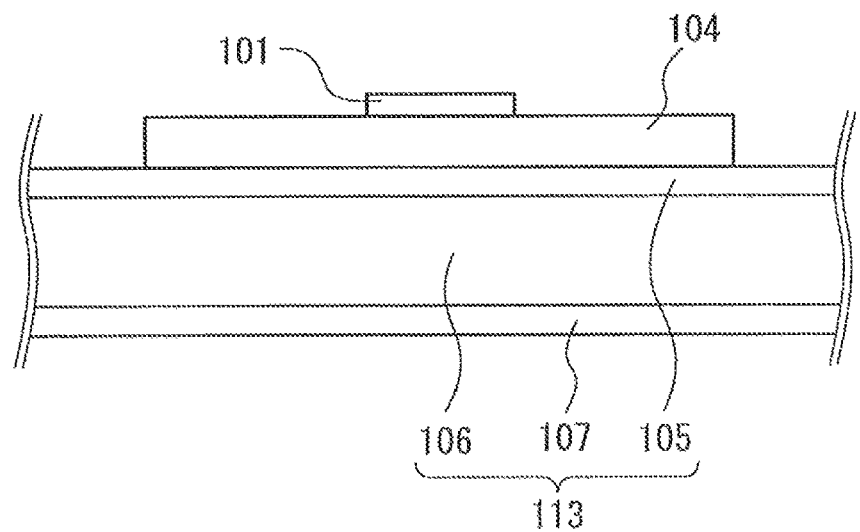
FIG. 6B is a front view schematically showing the configuration of the device detecting the spatial variation of the complex permittivity 40.

Next, a device detecting a spatial variation of a complex permittivity 40 according to a fourth exemplary embodiment will be described. FIG. 6A is a top view schematically showing the configuration of the device detecting the spatial variation of the complex permittivity 40. FIG. 6B is a front view schematically showing the configuration of the device detecting the spatial variation of the complex permittivity 40. The device detecting the spatial variation of the complex permittivity 40 is a modified example of the device detecting the spatial variation of the complex permittivity 30.

The device detecting the spatial variation of the complex permittivity 40 includes the open-type transmission line 113 which is composed of the conductor electrode unit 105, the dielectric layer 106, and the conductor plate 107. The traveling direction (direction A) of the electromagnetic wave signal transmitted through the open-type transmission line 113 is substantially perpendicular to the longitudinal direction (direction B) of the RFID tag 101. In the device detecting the spatial variation of the complex permittivity 40, a distance L3 between the center of the RFID tag 101 and an end of the conductor electrode unit 105 is equal to or less than ½ of the vacuum wavelength of the electromagnetic wave signal.

The open-type transmission line 113 mainly transmits electromagnetic waves in the space between the conductor electrode unit 105 and the conductor plate 107 serving as a ground. At this time, the electromagnetic field strength leaking from the open-type transmission line 113 is increased in the vicinity of an end of the conductor electrode unit 105 within a section perpendicular to the traveling direction A of the transmitted electromagnetic wave.

Therefore, when the RFID tag 101 is located at a position closer to an end of the conductor electrode unit 105, the electromagnetic wave signals can be more effectively exchanged via the space between the RFID tag 101 and the conductor electrode unit 105, as compared with the case where the RFID tag 101 is located at a position closer to the center (as indicated by a line C in FIG. 6A) of the conductor electrode unit 105.

From the experimental fact, it has been found that the distance between a central portion of the RFID tag 101 and an end of the conductor electrode unit 105 is desirably equal to or less than ½ of the vacuum wavelength of the electrode wave used for signals.

The RFID tag 101 generally has a rectangular parallelepiped structure, and the conductor tag antenna unit 102 is sensitive to the oscillating electric field in the longitudinal direction B of the RFID tag 101. On the other hand, the electric field of the electromagnetic wave signal transmitted through the open-type transmission line 113 is oscillating mainly in the direction perpendicular to the traveling direction A of the electromagnetic wave signal.

Thus, the longitudinal direction B of the RFID tag 101 is set to be substantially perpendicular to the traveling direction A of the transmitted electromagnetic wave signal, thereby making it possible to more effectively exchange the electromagnetic wave signals via the space between the RFID tag 101 and the conductor electrode unit 105.

According to the configuration described above, it is possible to provide a device detecting a spatial variation of a complex permittivity capable of effectively exchanging the electromagnetic wave signals between the RFID tag 101 and the conductor electrode unit 105 in the device detecting the spatial variation of the complex permittivity provided with the open-type transmission line, and an article presence/absence detection system incorporating the device detecting the spatial variation of the complex permittivity.

Fifth Exemplary Embodiment

Figure 7A:
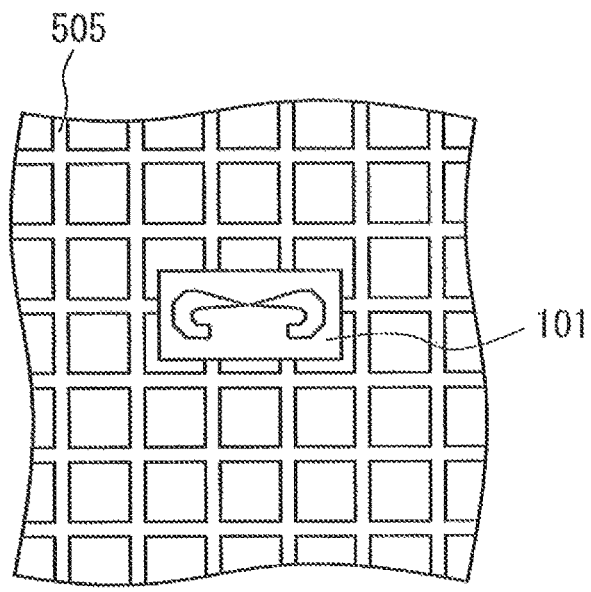
FIG. 7A is a top view schematically showing a configuration of a device detecting a spatial variation of a complex permittivity 50.
Figure 7B:
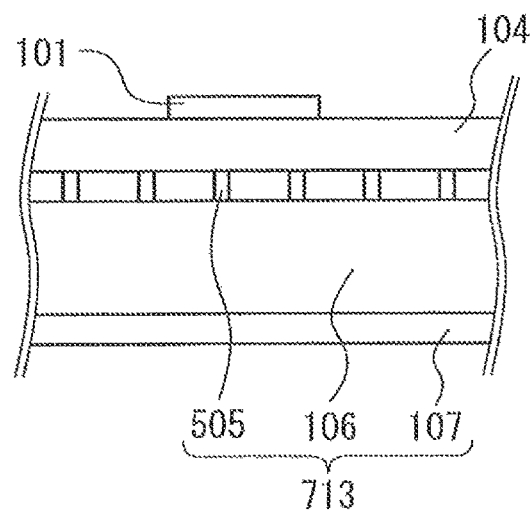
FIG. 7B is a front view schematically showing the configuration of the device detecting the spatial variation of the complex permittivity 50.

Next, a device detecting a spatial variation of a complex permittivity 50 according to a fifth exemplary embodiment will be described. FIG. 7A is a top view schematically showing the configuration of the device detecting the spatial variation of the complex permittivity 50. FIG. 7B is a front view schematically showing the configuration of the device detecting the spatial variation of the complex permittivity 50. The device detecting the spatial variation of the complex permittivity 50 is a modified example of the device detecting the spatial variation of the complex permittivity 30. To facilitate understanding of the configuration of the device detecting the spatial variation of the complex permittivity 50, the illustration of the dielectric tag base material 104 is omitted in FIG. 7A.

The device detecting the spatial variation of the complex permittivity 50 has a configuration in which the conductor electrode unit 105 of the device detecting the spatial variation of the complex permittivity 20 is replaced by a conductor electrode unit 505. The conductor electrode unit 505 is composed of a mesh-like conductor including a plurality of rectangular openings. The conductor electrode unit 505, the dielectric layer 106, and the conductor plate 107 constitute a sheet-like line 713.

The sheet-like line 713 is a substantially parallel flat plate line that transmits electromagnetic waves mainly in the region of the dielectric layer 106 which is sandwiched between the conductor electrode unit 505 and the conductor plate 107. In this exemplary embodiment, since the conductor electrode unit 505 is formed in a mesh-like shape, the electromagnetic waves transmitted through the sheet-like line 713 are not trapped in the dielectric layer 106, but leak upward from the openings of the mesh-like conductor electrode unit 505 on the opposite side of the dielectric layer 106.

Accordingly, the sheet-like line 713 can be regarded as a sheet-like open-type transmission line. In other words, a leaking electromagnetic field extends in a wide range on the surface of the mesh-like conductor electrode unit 505. This allows the RFID tag 101 to exchange the electromagnetic wave signals with the conductor electrode unit 505 via a space at a relatively wide area on the dielectric tag base material 104.

When the sheet-like line 713 has a slender structure which is sufficiently long in the traveling direction of the electromagnetic wave signal to be transmitted, a large amount of electromagnetic field leaks from an end of the conductor electrode unit 505. For this reason, the RFID tag 101 is desirably located at a position closer to an end of the conductor electrode unit 505.

According to the configuration described above, it is possible to provide a device detecting a spatial variation of a complex permittivity in which the degree of freedom of selecting the space of which a complex permittivity variation can be detected is increased, and an article presence/absence detection system incorporating the device detecting the spatial variation of the complex permittivity.

Sixth Exemplary Embodiment

Figure 8:
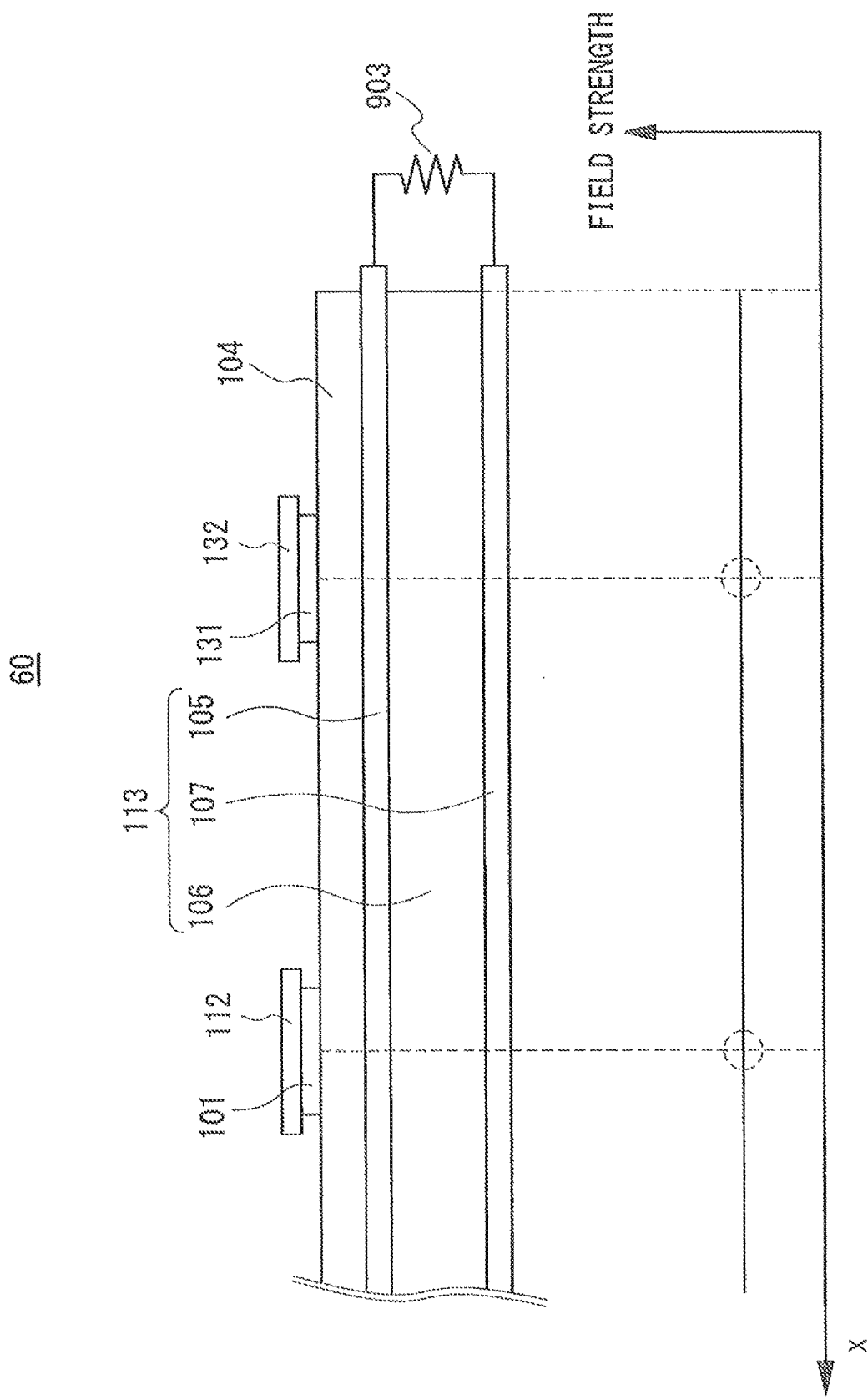
FIG. 8 is a diagram schematically showing an electric field strength and a configuration of a device detecting a spatial variation of the complex permittivity 60.

Next, a device detecting a spatial variation of a complex permittivity 60 according to a sixth exemplary embodiment will be described. FIG. 8 is a diagram schematically showing an electric field strength and the configuration of the device detecting the spatial variation of the complex permittivity 60. The device detecting the spatial variation of the complex permittivity 60 is a modified example of the device detecting the spatial variation of the complex permittivity 30.

The device detecting the spatial variation of the complex permittivity 60 includes the open-type transmission line 113 which is composed of the conductor electrode unit 105, the dielectric layer 106, and the conductor plate 107. A line terminal of the open-type transmission line 113 is nearly match-terminated in a circuit manner by a terminating resistor 903.

In the transmission line with a length equal to or more than the order of the vacuum wavelength of the electromagnetic wave to be transmitted, if there is an impedance discontinuity in the mode of the transmitted electromagnetic wave at the line terminal or within the line, a part of the transmitted electromagnetic wave is reflected on the discontinuous surface. As a result, the electromagnetic waves of opposite traveling directions interfere with each other, which causes a standing wave. The strength of the standing wave increases as the degree of the impedance discontinuity increases.

FIG. 9 is a front view schematically showing the configuration of the device detecting the spatial variation of the complex permittivity when there is an impedance discontinuity in the mode of the electromagnetic wave to be transmitted. As shown in FIG. 9, the terminating resistor 903 is replaced by a conductor terminal 803, which is an impedance discontinuity point, unlike in FIG. 8. When the electromagnetic field strength of the standing wave dominates the electromagnetic field strength of the traveling wave, an antinode and a node appear remarkably in the electric field strength of the standing wave as shown in FIG. 9. In the case of FIG. 8, since the RFID tag 101 is located at a position closer to the node of the standing wave, the efficiency of exchanging electromagnetic wave signals in the RFID tag 101 is lower than that in the RFID tag 131 which is located at the antinode of the standing wave. If the effect of the standing wave appears more remarkably, it is impossible to read or write the RFID tag at the position of the RFID tag 101.

As shown in FIG. 9, when the conductor terminal 803 is provided at the line terminal to connect the conductor electrode unit 105 and the conductor plate 107 to each other, or when the line terminal is formed with an open end, almost all the electromagnetic wave signals are reflected at the line terminal, so that the standing wave strength becomes substantially maximum.

On the other hand, as shown in FIG. 8, in the configuration according to this exemplary embodiment, the terminating resistor 903 is provided at the line terminal of the open-type transmission line 113. The conductor electrode unit 105 and the conductor plate 107 are connected together with the terminating resistor 903, thereby allowing the electromagnetic wave signals, which are transmitted through the open-type transmission line 113, to be consumed as heat, while preventing the electromagnetic wave signals from being reflected at the line terminal.

Thus, as shown in FIG. 8, the effect of the standing wave can be suppressed and the electric field strength of the traveling wave can be made uniform. This results in a reduction in variations of the reading performance between the RFID tags 101 and 131 which are placed at different positions above the open-type transmission line 113.

In view of the impedance continuity, it is desirable to use a resistor element having a characteristic impedance value of the open-type transmission line 113 for electromagnetic wave signals to be transmitted, or having a resistance value approximate to the characteristic impedance value, as the terminating resistor 903. In another alternative, an electromagnetic wave absorber such as a magnetic material sheet may be used as the terminating resistor 903. Further, the terminating resistor 903 is not necessarily disposed at the line terminal. The position of the terminating resistor 903 may be arbitrarily changed depending on the position of the RFID tag.

According to the configuration described above, it is possible to provide a device detecting the spatial variation of the complex permittivity capable of suppressing the positional dependence of the reading performance of each RFID tag on the open-type transmission line 113, and an article presence/absence detection system incorporating the device detecting the spatial variation of the complex permittivity.

Note that the present invention is not limited to the above exemplary embodiments and can be modified in various manners without departing from the scope of the invention. For example, while the devices detecting the spatial variation of the complex permittivity 31 and 32 include the dielectric layer 106 and the conductor plate 107 as described above, the devices detecting the spatial variation of the complex permittivity 31 and 32 may have a configuration similar to that of the device detecting the spatial variation of the complex permittivity 10 in which the dielectric layer 106 and the conductor plate 107 are not provided.

In the above exemplary embodiments, the dielectric protective layer 112 may be provided or omitted.

The whole or part of the exemplary embodiments disclosed above can be described as, but not limited to, the following supplementary notes.

(Supplementary note 1) A device detecting a spatial variation of a complex permittivity comprising:

at least one RFID tag that performs communication using an electromagnetic wave in a UHF band;

an electrode unit that communicates with the RFID tag by using the electromagnetic wave in the UHF band; and a first dielectric layer that is provided between the RFID tag and the electrode unit and separates the RFID tag from the electrode unit.

(Supplementary note 2) The device detecting the spatial variation of the complex permittivity according to Supplementary note 1, wherein a distance between the RFID tag and the electrode unit is equal to or more than one-hundredth of a vacuum wavelength of the electromagnetic wave used for the communication.

(Supplementary note 3) The device detecting the spatial variation of the complex permittivity according to Supplementary note 1 or 2, wherein a distance between the RFID tag and the electrode unit is equal to or less than one-fourth of a vacuum wavelength of the electromagnetic wave used for the communication.

(Supplementary note 4) The device detecting the spatial variation of the complex permittivity according to any one of Supplementary notes 1 to 3, wherein the at least one RFID tag comprises a plurality of FRID tags, the plurality of RFID tags include different identification codes, respectively, and the plurality of RFID tags are respectively provided at different positions on the first dielectric layer.

(Supplementary note 5) The device detecting the spatial variation of the complex permittivity according to any one of Supplementary notes 1 to 4, wherein a distance between a center of the RFID tag and an end of the electrode unit which is closest to the RFID tag is equal to or less than a half of a vacuum wavelength of the electromagnetic wave used for the communication.

(Supplementary note 6) The device detecting the spatial variation of the complex permittivity according to any one of Supplementary notes 1 to 5, further comprising:

a second dielectric layer; and a conductor plate that serves as a ground electrode and is opposed to the electrode unit with the second dielectric layer interposed therebetween, wherein the electrode unit, the second dielectric layer, and the conductor plate constitute an open-type transmission line.

(Supplementary note 7) The device detecting the spatial variation of the complex permittivity according to Supplementary note 6, wherein the RFID tag comprises an antenna unit that transmits and receives the electromagnetic wave in the UHF band, and an electronic field direction of an oscillating electromagnetic field sensed by the antenna unit during reception is a direction substantially perpendicular to a traveling direction of an electromagnetic wave transmitted through the open-type transmission line.

(Supplementary note 8) The device detecting the spatial variation of the complex permittivity according to Supplementary note 6 or 7, wherein the electrode unit is configured as a mesh-like sheet conductor including a plurality of openings from which the first dielectric layer is exposed, and the conductor plate is configured as a conductor having a flat plate shape.

(Supplementary note 9) The device detecting the spatial variation of the complex permittivity according to any one of Supplementary notes 6 to 8, wherein at least a part of the open-type transmission line is electrically nearly match-terminated.

(Supplementary note 10) The device detecting the spatial variation of the complex permittivity according to any one of Supplementary notes 6 to 9, wherein the electrode unit and the conductor plate are connected together with a conductive member.

(Supplementary note 11) The device detecting the spatial variation of the complex permittivity according to Supplementary note 10, wherein the electrode unit and the conductor plate are connected together via a resistor element.

(Supplementary note 12) The device detecting the spatial variation of the complex permittivity according to any one of Supplementary notes 1 to 11, wherein a distance between the RFID tag and an article to be detected is equal to or less than one-tenth of a vacuum wavelength of the electromagnetic wave used for the communication, the article causing a space complex permittivity in the vicinity of the RFID tag to be varied when the article approaches the RFID tag.

(Supplementary note 13) The device detecting the spatial variation of the complex permittivity according to Supplementary note 12, further comprising a protective layer that covers a surface of the RFID tag, the surface being opposite to the first dielectric layer.

(Supplementary note 14) An article presence/absence detection system comprising:

a device detecting a spatial variation of a complex permittivity;

a reader/writer unit that outputs a read electromagnetic wave signal to the device detecting the spatial variation of the complex permittivity, and receives, from the device detecting the spatial variation of the complex permittivity, a response electromagnetic wave signal in response to the read electromagnetic wave signal, thereby performing an RFID tag reading operation;

an interface unit that mediates an exchange of the electromagnetic wave signals between the device detecting the spatial variation of the complex permittivity and the reader/writer unit; and a display unit that displays a result of the reading operation performed by the reader/writer unit, wherein the device detecting the spatial variation of the complex permittivity comprises:

the RFID tag that performs communication by using the read electromagnetic wave signal and the response electromagnetic wave signal in a UHF band;

an electrode unit that communicates with the RFID tag by using the read electromagnetic wave signal and the response electromagnetic wave signal; and a first dielectric layer that is provided between the RFID tag and the electrode unit and separates the RFID tag from the electrode unit.

(Supplementary note 15) A method for detecting presence/absence of an article, comprising:

performing communication using an electromagnetic wave in a UHF band between an RFID tag that performs communication using the electromagnetic wave in the UHF band and an electrode unit that communicates with the RFID tag by using the electromagnetic wave in the UHF band, in a state in which a first dielectric layer that separates the RFID tag from the electrode unit is provided between the RFID tag and the electrode unit.

While the present invention has been described above with reference to exemplary embodiments, the present invention is not limited to the above exemplary embodiments. The configuration and details of the present invention can be modified in various manners which can be understood by those skilled in the art within the scope of the invention.

This application is based upon and claims the benefit of priority from Japanese patent application No. 2012-265429, filed on Dec. 4, 2012, the disclosure of which is incorporated herein in its entirety by reference.

REFERENCE SIGNS LIST 10, 20, 30, 40, 50, 60 DEVICE DETECTING SPATIAL VARIATION OF COMPLEX PERMITTIVITY
11, 31, 32 ARTICLE PRESENCE/ABSENCE DETECTION SYSTEM
101, 131, 132, 133 RFID TAG
102 CONDUCTOR TAG ANTENNA UNIT
103 IC UNIT
104 DIELECTRIC TAG BASE MATERIAL
105, 505 CONDUCTOR ELECTRODE UNIT
106 DIELECTRIC LAYER
107 CONDUCTOR PLATE
108 INTERFACE UNIT
109 RFID READER/WRITER
110 INDICATOR
111 ARTICLE
112 DIELECTRIC PROTECTIVE LAYER
113 OPEN-TYPE TRANSMISSION LINE
713 SHEET-LIKE LINE
803 CONDUCTOR TERMINAL
903 TERMINATING RESISTOR

The invention claimed is:

1. A device detecting a spatial complex permittivity comprising:
at least one RFID tag configured to perform communication using an electromagnetic wave in a UHF band;
an electrode unit configured to communicate with the RFID tag by using the electromagnetic wave in the UHF band; and
a first dielectric layer configured to be provided between the RFID tag and the electrode unit and to separate the RFID tag from the electrode unit, the first dielectric layer being in contact with the RFID tag and the electrode unit, wherein
a reader/writer unit communicates with the electrode unit by using the electromagnetic wave in the UHF band via an interface unit.

2. The device detecting the spatial complex permittivity according to claim 1, wherein a distance between the RFID tag and the electrode unit is equal to or more than one-hundredth of a vacuum wavelength of the electromagnetic wave used for the communication.

3. The device detecting the spatial complex permittivity according to claim 1, wherein a distance between the RFID tag and the electrode unit is equal to or less than one-fourth of a vacuum wavelength of the electromagnetic wave used for the communication.

4. The device detecting the spatial complex permittivity according to claim 1, wherein
the at least one RFID tag comprises a plurality of RFID tags,
the plurality of RFID tags comprise different identification codes, respectively, and
the plurality of RFID tags are respectively provided at different positions on the first dielectric layer.

5. The device detecting the spatial complex permittivity according to claim 1, wherein a distance between a center of the RFID tag and an end of the electrode unit which is closest to the RFID tag is equal to or less than a half of a vacuum wavelength of the electromagnetic wave used for the communication.

6. The device detecting the spatial complex permittivity according to claim 1, further comprising:
a second dielectric layer; and
a conductor plate that serves as a ground electrode and is opposed to the electrode unit with the second dielectric layer interposed therebetween,
wherein the electrode unit, the second dielectric layer, and the conductor plate constitute an open-type transmission line.

7. The device detecting the spatial complex permittivity according to claim 6, wherein
the RFID tag comprises an antenna unit that transmits and receives the electromagnetic wave in the UHF band, and
an electronic field direction of an oscillating electromagnetic field sensed by the antenna unit during reception is a direction substantially perpendicular to a traveling direction of an electromagnetic wave transmitted through the open-type transmission line.

8. The device detecting the spatial complex permittivity according to claim 6, wherein
the electrode unit is configured as a mesh-like sheet conductor comprising a plurality of openings from which the first dielectric layer is exposed, and
the conductor plate is configured as a conductor having a flat plate shape.

9. The device detecting the spatial complex permittivity according to claim 6, wherein at least a part of the open-type transmission line is electrically nearly match-terminated.

10. A system comprising:

an RFID tag;

an electrode unit, the RFID tag and the electrode unit communicating using an electromagnetic wave in a UHF band to detect the presence or absence of an article;

a first dielectric layer configured to be provided between the RFID tag and the electrode unit and to separate the RFID tag from the electrode unit, the first dielectric layer being in contact with the RFID tag and the electrode unit;

a conductor plate that serves as a ground electrode and is opposed to the electrode unit with a second dielectric layer interposed therebetween;

an interface unit; and a reader/writer unit configured to communicate with the electrode unit by using the electromagnetic wave in the UHF band via the interface unit, wherein the electrode unit, the second dielectric layer, and the conductor plate constitute an open-type transmission line.

* * * * *